Patented June 14, 1938

2,120,643

UNITED STATES PATENT OFFICE 2,120,643

METHOD OF PREPARING AN OXYGEN-LIBERATING COMPOSITION

Kurt A. Gerson, London, England

No Drawing. Application June 29, 1934, Serial No. 733,121. In Great Britain July 3, 1933

11 Claims. (Cl. 23—244)

This invention relates to the manufacture of oxygen-liberating compositions, especially those for use in regeneration of respired air to render it fit for further breathing.

It has been proposed to produce such compositions by exothermic reaction of alkali peroxides and hydrated alkali peroxides, but the compositions available heretofore have been subject to several major disadvantages which have militated against their widespread adoption. It has been found, for example, that in making such compositions according to the processes known heretofore, the peroxide, more especially upon the addition thereto of the alkali peroxide hydrate, tends to lose its available oxygen. This loss of oxygen from the mass continues, and in many cases progressively increases, to the end of the reaction between the hydrate and the superoxide. This disadvantage is encountered particularly in large scale operation, and frequently the result is a loss of as much as 50 per cent of the initially available oxygen.

A further difficulty which has been experienced is that it is generally inconvenient, owing to the reaction which results in the aforesaid loss of oxygen, to compress the mass into consolidated form (which is usual in the process) before the reaction between the peroxide hydrate and anhydrous peroxide is completed, and when this is not done and the compression step is deferred until after the said reaction is completed, the end product of the process lacks sufficient porosity for efficient use in a respirator.

A further disadvantage has been that the compositions have not begun to function immediately upon passage of air therethrough, which is, of course, a serious situation when badly vitiated air is encountered. Various means have been proposed to remedy this deficiency, such as providing a small cylinder of oxygen for supplying oxygen to the respirator during the period preceding full activity of the exchange composition, or supplying carbon dioxide to accelerate the starting. But such means increase the complexity, weight and cost of the apparatus and are thus undesirable.

It has been proposed also to use catalysts intended to initiate reaction promptly between the composition and the $CO_2$ of the respired air. However, even when using catalysts it has been characteristic of the compositions that their activity diminishes, and may cease, while there still remains a substantial proportion of available oxygen. Obviously such a condition is uneconomical, and it is particularly disadvantageous because usually it is desirable that the canister have a long useful service period.

It is a major object of this invention to provide improved compositions of the type referred to, formed from anhydrous and hydrated alkali peroxide, which do not suffer material loss of available oxygen during manufacture, are consolidated into a form strong enough and porous enough for respirator use, afford exchange at substantially the theoretical rate of their available oxygen and the carbon dioxide of the air which is to be regenerated, and whereby the foregoing and other disadvantages are minimized or overcome.

A particular object is to provide such compositions in which reaction is initiated at a satisfactory rate immediately upon contact with air containing carbon dioxide, and which continue to exchange oxygen satisfactorily until the available oxygen is substantially exhausted.

The invention is predicated in part upon my discovery that the loss of oxygen during manufacture of the compositions may be avoided by protecting the alkali peroxide from the influence of the atmosphere, more especially after admixture with the alkali peroxide hydrate. Access of air may be prevented in various ways, as by operating in vacuo, but preferably the materials are protected by a fluid medium which is inert towards the peroxide and the peroxide hydrate and intervenes between them and the neighbouring atmosphere.

Without limiting myself to this explanation, I now believe that the loss of oxygen heretofore encountered has been due to the influence of the moisture and carbon dioxide normally present in the atmosphere in amounts sufficient to cause reaction. By isolating the mass from the atmosphere in accordance with this invention such premature attack of the moisture and carbon dioxide upon the unstable peroxide is prevented, so that the resultant composition retains all of its available oxygen.

In the practice of the invention the compositions are made from an anhydrous alkali peroxide and a relatively small proportion of hydrated alkali peroxide. While various peroxides may be used, those of sodium or potassium ($Na_2O_2$ or $K_2O_4$) are preferred. The anhydrous peroxide should be finely ground; preferably it is in the form of an impalpable powder. The term "hydrated" as used herein does not have reference to the alkali hydroxides, but is used to designate peroxides containing water of hydration, various hydrates being known and having been proposed for this purpose. Advantageously the peroxide hydrate is of the higher hydrated form, the octahydrate, for example, in the case of Na₂O₂. The two materials are mixed intimately, and after mixing they are caused to undergo an exothermic reaction which converts the mixture into the exchange composition. These details may be conducted in accordance with the practice previously existing, but in accordance with this invention the materials are protected from the atmosphere, as just referred to and in the manner now to be described more in detail.

The fluid protecting medium used in the preferred embodiment may be a gas, vapor, or a liquid adapted to screen, or blanket, the peroxides from the influence of the atmosphere. If a gas or vapor be used either may be introduced as such into the reaction vessel or other piece of apparatus containing the mass to be protected, or evolved in situ therein from the liquid of the medium, that is to say, for instance, by the heat of the mass.

Thus, there may be used a protective liquid which remains as such, or the protecting medium may be a liquid adapted to gasify or vaporize, preferably completely, during the exothermic reaction which proceeds in the process between the peroxide and the alkali peroxide hydrate, the said medium both while in liquid form and also while in gaseous or vapor form serving to protect the material from the influence of the neighbouring atmosphere.

Ordinarily the reaction mass will be so disposed that the neighbouring atmosphere is above it, and in such case the gas or vapor of the protecting medium should be of greater density than that of the atmosphere so as by gravity to maintain its protective action.

Most suitably the protective agent is formed of a readily vaporizable liquid, such as the chlorine substitution products of hydrocarbons, especially of the paraffin series, carbon tetrachloride being the preferred example, although others may be used, such as ethylene dichloride, methylene dichloride, trichlor-ethylene, and the like. If the agent be a liquid which remains as such it is necessary subsequently to remove it, as by filtration or filter pressing. But in the use of the vaporizable compounds referred to the agent may be removed completely as a result of a subsequent step, presently to be described, and these agents are of very low solubility for water and are non-flammable, which is advantageous, as well as being characterized by forming heavy vapors which completely and effectively blanket the peroxide composition.

If the protective medium used in the process be one applied initially in liquid form, as in the case of carbon tetrachloride, the reactants of the mixture being moistened with this medium in liquid form before the reaction commences, there is the further advantage that the formation of dust, which is very troublesome owing to the caustic nature of the constituents, is entirely or almost entirely avoided owing to the "moist" condition of the materials.

As will be appreciated, if the isolating medium be applied in liquid form to the mass to be reacted, it should be added in appropriate quantity. In this connection, it may be remarked that the quantity added should be such as only to render the material superficially moist; in the case of carbon tetrachloride this quantity is generally from 4 to 8 per cent by weight reckoned upon the total weight of the mass to be reacted.

In any given case, however, the appropriate quantity is readily determinable by simple preliminary trial.

A further important feature of the present invention resides in the operation of initially grinding the peroxide to a high degree of fineness. This has been found to be desirable because thereby the subsequent reaction with the alkali peroxide hydrate is enhanced in so far as the degree and uniformity of porosity are concerned. Advantageously this step also is performed with the peroxide protected from the atmosphere by a fluid composition intervening, as just described.

Thus, preferably, the whole process of manufacture of the oxygen-liberating composition is effectuated with the materials protected from the surrounding atmosphere. It has been found in actual practice that by this means the various operations in the process are very considerably simplified. By this means the elimination of the loss of oxygen aforesaid in the manufacturing process may be still further ensured.

The anhydrous peroxide having been finely ground it is mixed with the requisite amount of hydrated peroxide to prepare the mixture for reaction. Conveniently the protective medium used in preparing the hydrated peroxide or in grinding the anhydrous peroxide is used in the mixing step. Thus, if CCl₄ was used to protect the hydrate during its formation, sufficient may remain to protect the mixture while being intimately mixed. Or, further protective medium may be added.

According to another feature of the process of the present invention, the intimate mixture of alkali peroxide and alkali peroxide hydrate may be consolidated by pressure before the exothermic reaction which proceeds between them has reached completion, advantageously before said reaction has commenced.

Such pressure-consolidation of the mixture may be effected in a tabletting or other pressure-moulding machine, in which event the amount of liquid protecting medium present in the mixture immediately prior to the pressure-consolidation step should be sufficient only to render the mixture moist, that is to say, the mixture should still be segregate. If the protecting medium be carbon tetrachloride, for example, the amount present in the mixture immediately prior to the consolidation step may generally be from about 4 to 8 per cent by weight reckoned upon the total weight of the mixture.

Alternatively, the pressure-consolidation of the mixture may consist in a granulating step, in which event the amount of liquid protecting medium which is present in the mixture immediately prior to the granulating operation should be sufficient to render the mixture a granulable paste, for example in the case of CCl₄ it should be of the order of from 30 to 50 per cent by weight reckoned upon the total weight of the mixture.

The carbon tetrachloride, or other liquid air-isolating medium, may be applied to the anhydrous peroxide either prior to the grinding operation, or during said operation or both. As will be appreciated in this connection, the quantity of carbon tetrachloride added should be small enough not to interfere with the subsequent sieving operations. The grinding operation, however, may if desired be effected by a wet or semi-wet method, in which event relatively larger quantities of carbon tetrachloride or the like may be added and the excess separated by filtration afterwards. Also, clay or other suitable inert substances may be added during the process to confer plasticity to the composition, if desirable from the granulating or tabletting standpoint.

After the peroxide and peroxide hydrate have been mixed and compressed the mixture is caused to undergo reaction to prepare it for use, and the protection from access of air is continued during this step. The temperature which obtains during reaction, during which porosification occurs, should be maintained between approximately 80° C., and 120° C., if necessary by cooling means.

It will be understood that during the reaction between the peroxide and the hydrate which results in porosification of the former of these components, the protective fluid, e. g., carbon tetrachloride, progressively vaporizes from the surfaces of the ingredients of the mix and rises to the space above the surface of the reacting mass where it operates to isolate the said mass from the neighbouring body of air above it. This evolution of carbon tetrachloride vapor from the reacting materials proceeds throughout the process and care should be taken therefore to ensure that there shall be added initially to the materials sufficient protective liquid to suffice for the purpose for which it is present until the reaction has proceeded to completion. On the other hand, a deficiency of isolating medium may generally be made up during the course of the reaction by further introduction of the medium into the reaction vessel.

It will further be understood, more especially from the immediate foregoing, that the gaseous or vaporous isolating medium should preferably be one which has a higher density than air.

There may also be added to the mass one of the catalysts used in such compositions, of which metallic copper and copper oxide are examples. Such catalysts serve a useful purpose, but heretofore they have not sufficed to cause the liberation of all of the oxygen.

The invention is based further on my discovery that certain catalysts are capable of causing the perfect $O_2:CO_2$ exchange to continue until the mass is exhausted. These catalysts are substances adapted to supply small amounts of water to the mass after a substantial amount of its available oxygen has been evolved, i. e., substances capable of dehydration at a temperature of, for example, 140 to 200° C., particularly toward 200° C., which is about the temperature reached in use at which prior compositions generally cease to liberate oxygen, or at which the rate of evolution declines. These catalysts may be hydrated compounds, or salts, adapted to release their water of crystallization to supply water to the mass during the later stages of its use. Copper salts are preferred, although other similar salts are known which might be used. At present I prefer to use copper oxychloride ($CuCl_2.3CuO.3H_2O$) for this purpose.

It is found that by proceeding according to the present invention, the oxygen-liberating composition produced is of an exceedingly high order of efficiency of use. Thus, it is characteristically very sensitive to initial action, that is to say, upon first contact with the respired air to be reconditioned, and it requires no assistance of auxiliary agents, such as the presence of a separate chemical substance incorporated in the material, or a preliminary supply of oxygen or of carbon dioxide admitted to the material, to initiate its action.

An example of how the invention may be carried into effect will now be given, purely by way of example.

To one hundred parts of sodium peroxide ($Na_2O_2$) ground to finely powdered form in the presence of four parts of carbon tetrachloride there are added eight parts of sodium peroxide octahydrate ($Na_2O_2.8H_2O$) and two parts of copper oxychloride, (all parts given being by weight). These ingredients are intimately mixed together, as by grinding in a ball mill, the carbon tetrachloride spreading over the surfaces of the alkali peroxide hydrate and catalyst particles and the resulting mixture being a loose moist mass somewhat simulating moist sand as regards consistency.

The said mixture is then fed through a tabletting machine in which it becomes pressure-consolidated prior to the commencement of the exothermic reaction which is now permitted to proceed between the constituents of the compressed mixture, the tablets of the latter being first crushed and maintained during the reaction at the requisite temperature therefor, for example about 120° C. During said reaction moreover the crushed material is preferably maintained in movement so as to prevent its agglomeration to an undesirable degree.

At the end of the reaction the material is a porous coherent solid, completely free of the protecting medium (carbon tetrachloride), which has become entirely driven off from the reaction mass by volatilization therefrom under the heat of the reaction.

If desired, there may be combined in the improved process according to this invention the following operations performed in one and the same apparatus:—the formation of the parent alkali peroxide hydrate, the grinding of the ingredients of the mixture of the required degree of fineness and the intimate admixing together of said ingredients, the amount of liquid protecting medium present being sufficient to enable the grinding operation at least to be performed under wet grinding conditions.

As another example, there may be used.

| | Parts by weight |
|---|---|
| $Na_2O_2$ | 100 |
| $Na_2O_2.8H_2O$ | 4 to 8 |
| Catalyst | ½ to 2 |
| $CCl_4$ | 4 to 8 |

The catalyst advantageously consists of ¼ to ½ part by weight of hydrated copper oxychloride, and the balance a known catalyst, such as finely divided metallic copper. Or, from ½ to 1 part of another hydrated copper salt, such as $CuSO_4.5H_2O$, may be used in place of the foregoing catalyst.

Still another example of the mode of practicing the invention follows. One mol. (78 grams) of finely powdered anhydrous sodium peroxide is suspended in cooled carbon tetrachloride by means of a mechanical stirrer. Eight mols (144 grams) of previously cooled water are added slowly to the mixture. The voluminous mass is then quickly filtered on a suction filter. The carbon tetrachloride acts as a protective medium, as described hereinabove, but preferably its action is augmented by permitting only dry, carbon dioxide free air to contact the material. This forms sodium peroxide octahydrate. The exchange composition is formed by mixing 60 grams of the octahydrate with 1000 grams of cooled anhydrous sodium peroxide and 15 grams of copper oxychloride. The material is protected in the manner described herein, and the materials are intimately incorporated with one another as by mixing in a ball mill. The intimate mixture is then compressed into cakes sufficiently hard to be broken easily, and the cakes are granulated and screened to desired size. The granules are then heated to 140° C., when reaction occurs which causes the granules to become hard and porous. The material thus prepared is stored in air-tight containers until it is to be used.

According to the provisions of the patent statutes, I have explained the principle of my invention, and have described what I now consider to represent its best embodiment. However, I desire to have it understood that, within the scope of the appended claims, the invention may be practiced otherwise than as specifically described.

I claim:

1. In a process of preparing an oxygen-liberating composition from an alkali peroxide and a hydrated alkali peroxide, the step comprising mixing said peroxide and hydrated peroxide and during mixing protecting the mixture from air by a fluid inert with respect thereto and readily removable therefrom.

2. In a process of preparing an oxygen-liberating composition from an alkali peroxide and a hydrated alkali peroxide, the steps comprising intimately mixing said peroxide and hydrated peroxide, converting the mixture into consolidated form, and during said mixing and consolidating maintaining between said materials and the surrounding air a fluid inert with respect to said materials and readily removable therefrom.

3. In a process of preparing an oxygen-liberating composition from an alkali peroxide and a hydrated alkali peroxide, the steps comprising intimately mixing said peroxide and hydrated peroxide in the presence of a liquid inert with respect to said materials and vaporizable to form vapor heavier than air, and converting the mixture into consolidated form, said liquid forming a vapor blanket preventing access of air to said materials.

4. A process according to claim 3, said liquid being a chlorine substitution product of a hydrocarbon of the paraffin series, said liquid being vaporizable and readily removable from the composition.

5. In a process of preparing an oxygen-liberating composition from an alkali peroxide and a hydrated alkali peroxide, the steps comprising intimately mixing said peroxide and hydrated peroxide in the presence of carbon tetrachloride, and converting the peroxide mixture into consolidated form, said carbon tetrachloride forming a vapor blanket protecting said peroxide mixture from air.

6. In a process of preparing an oxygen-liberating composition from an alkali peroxide and a hydrated alkali peroxide, the steps comprising intimately mixing said peroxide and hydrated peroxide in the presence of a fluid inert with respect thereto and adapted to prevent air from contact therewith, converting the mixture into consolidated form, and heating the mixture to cause reaction between the peroxide and hydrated peroxide, said fluid being readily removable from the composition.

7. In a process of preparing an oxygen-liberating composition from an alkali peroxide and a hydrated alkali peroxide, the steps comprising intimately mixing said peroxide and hydrated peroxide in the presence of a liquid readily removable chlorine substitution product of a paraffin hydrocarbon to prevent air from contact therewith, converting the mixture into consolidated form, and heating the mixture to cause reaction between the peroxide and hydrated peroxide.

8. In a process of preparing an oxygen-liberating composition from a sodium peroxide, and a sodium peroxide octahydrate, the steps comprising intimately mixing said peroxide and hydrated peroxide in the presence of a fluid inert with respect thereto and adapted to prevent contact of air therewith, converting the mixture into consolidated form, and heating the mixture to cause reaction between said peroxide and octahydrate, said fluid being readily removable from the composition.

9. In a process of preparing an oxygen-liberating composition from a sodium peroxide and a sodium peroxide octahydrate, the steps comprising intimately mixing said peroxide and hydrated peroxide in the presence of carbon tetrachloride, converting the mixture into consolidated form and heating the mixture to cause reaction between said peroxide and peroxide octahydrate and volatilize residual carbon tetrachloride.

10. In a process of preparing an oxygen-liberating composition from an alkali peroxide and a hydrated alkali peroxide, the steps comprising intimately mixing said peroxide with water in an amount to form hydrate thereof, intimately mixing a further amount of said peroxide and an amount of said hydrated peroxide, compressing the mixture into consolidated form, and in each of such steps preventing contact of air by a fluid inert with respect to said peroxide and hydrate, and heating the mixture to cause reaction between said peroxide and hydrated peroxide, said fluid being readily removable from the composition.

11. In a process of preparing an oxygen-liberating composition from an alkali peroxide and a hydrated alkali peroxide, the steps comprising intimately mixing said peroxide with water in an amount to form hydrate thereof, intimately mixing a further amount of said peroxide and an amount of said hydrated peroxide, compressing the mixture into consolidated form, and in each of such steps preventing contact of air by carbon tetrachloride, and heating the mixture to cause reaction between said peroxide and hydrated peroxide.

KURT A. GERSON.